Dec. 22, 1942.   W. MÖBIUS ET AL   2,305,792
DEVICE FOR SHIFTING THE CROSS FEED AND THE LONGITUDINAL FEED
OF THE TOOL CARRIER OF MACHINE TOOLS
Filed Dec. 26, 1939   3 Sheets-Sheet 1

Inventors:
Walter Möbius
Hans Hautsch
By Bailey u. Larson
Attys

Patented Dec. 22, 1942

2,305,792

UNITED STATES PATENT OFFICE 2,305,792

DEVICE FOR SHIFTING THE CROSS-FEED AND THE LONGITUDINAL FEED OF THE TOOL CARRIER OF MACHINE TOOLS

Walter Möbius and Hans Hautsch, Magdeburg, Germany; vested in the Alien Property Custodian Application December 26, 1939, Serial No. 311,049
In Germany December 24, 1938

5 Claims. (Cl. 82—22)

(Granted under the provisions of sec. 14, act of
March 2, 1927; 357 O. G. 5)

This invention is directed to shifting means of the tool carrier of machine tools, particularly lathes.

An object of this invention is to shift in the simplest manner possible the movements of a tool carrier, which travels only in one of two directions crossing each other, whereby the shifting is done in such a manner, that an obvious correspondency exists between the shifting movement of a shift member and the movements of a tool carrier, for example, the longitudinal feed and the cross feed of the tool carrier.

A further object of this invention is to provide only one lever for shifting in both directions and arranging the necessary drive means in a simple manner and in such a way, that the direction in which this lever is moved will always correspond to the direction in which the tool carrier travels.

Generally these objects of the invention are obtained by two clutches arranged parallel to each other and actuated by the shift lever in such a manner, that during the movement of the shift lever in one plane, it actuates the movable part of a clutch of a reversible gear drive inserted in the cross-feed drive, and during the movement of the shift lever in another plane, it actuates the movable clutch part of another reversible gear drive inserted in the longitudinal feed drive.

Furthermore the invention is directed to the selection, the arrangement, and the construction of the drives actuated by the shift lever, as well as to the means for mounting the lever for movement in the intended direction.

The latter object of the invention is obtained by a sleeve, which is actuated by the shift lever and provided with a key or the like engaging a cross-shaped guide arranged in the housing, so that the shift lever can swing in two paths crossing each other. In addition, the entire drive mechanism according to the invention is completely enclosed in a housing and therefore effectively protected against damage from an outside source.

Following, by way of example, a practical embodiment of the invention is more fully described and illustrated on the accompanying drawings in which.

Figure 1:
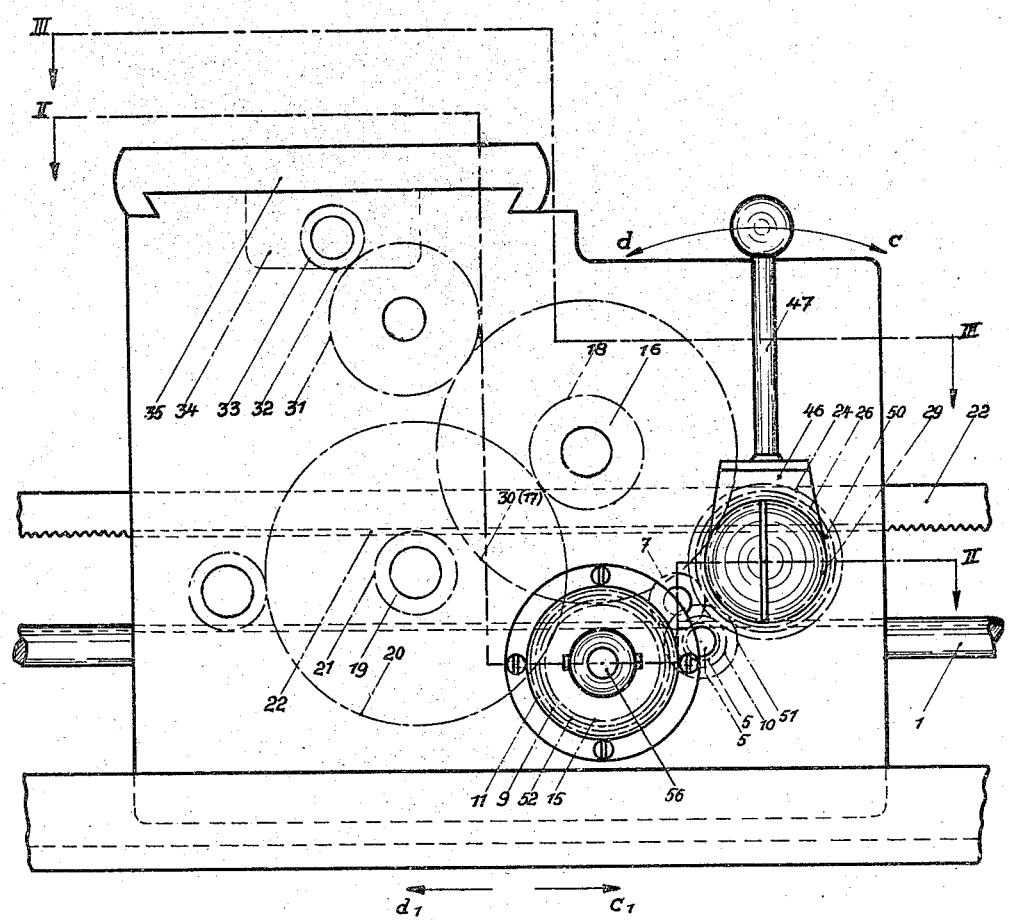
Fig. 1 is a side elevational view of the device.

We provide a shaft 1, which obtains its rotary motion from the main drive of the machine, and in particular from the feed box of the lathe; a bevel gear 2 is carried by shaft 1 and arranged thereon for axial displacement, and keyed to prevent radial displacement with regard to the shaft. The bevel gear 2 is supported by an arm 3 of a tool carrier supporting housing 4, which is slidably arranged on the lathe bed. The housing 4 supports a shaft 5 which carries a bevel gear 6 engaging the bevel gear 2.

Likewise, provided in the housing 4 is a spur gear 7, which meshes with the gear teeth of shaft 5, and a gear 9 loosely carried by a shaft 8. In addition, a gear 10 arranged on shaft 5 engages a gear 11 loosely supported by shaft 8. On shaft 8 the movable part 12 of a reversing clutch is interposed between the gears 9 and 11 (compare Fig. 2). The end surfaces of the clutch are provided with gear teeth 13, 14 opposing correspondingly toothed surfaces arranged on the gears 9 and 11. The movable part 12 of the clutch is provided with gear teeth 15 engaging a gear 17 fixedly secured to the shaft 16 (see Figs. 1 and 3). A gear 18 is rigidly connected with shaft 16 meshes with a gear 20 fastened to a shaft 19. The shaft 19 carries a gear 21 which engages a gear rack 22 affixed to the lathe bed.

In case the movable part 12 of the clutch (Fig. 2) is in engagement with gear 9, the shaft 19 is driven by shaft 1 over shaft 5, the interposed gear 7, gear 9, the teeth 15 of gear 12 to gear 17 and 18, 20. The gear 21 in engagement with the gear rack 22 and rotated by shaft 19 travels along this rack 22 in a longitudinal direction causing the housing 4 to move alongside the lathe bed in the same direction. A displacement of the housing 4 in an opposite direction is caused, when the movable clutch part 12 engages gear 11, which is in mesh with gear 10 of shaft 5, whereby gear 11 is driven directly by shaft 5 without interposition of another gear (7).

To effect a transverse movement of the tool carrier, the drives as described below are utilized:

Gear 10 of shaft 5 is in engagament with a gear 24 loosely supported by a shaft 23. This gear 24 forms a part of a clutch and for this purpose it is provided with teeth 25 on its frontal surface (compare especially Fig. 2). The shaft 5 is in connection with a gear 26 over the aforementioned spur gear 7 which is in mesh with the gear teeth of shaft 5 and gear 26. The gear 26 is loosely supported by shaft 23 and comprises a toothed surface 27 thus forming a part of a clutch. The movable part 28 of a clutch is interposed between the two gears 25 and 26. The teeth 29 of the clutch 28 mesh with gear 30 loosely supported by shaft 16 (compare especially Fig. 3); the gear 30 engages a gear 31, which is in mesh with a gear 32 of a spindle 33; in this manner the rotation of gear 30 is transmitted to the spindle 33, which by means of a nut 34 secured to the under face of the tool carrier (Fig. 2) effects the transverse displacement of the tool carrier 35. Depending upon the position of the clutch 28, which may be in engagement with either one of the gears 24 or 26, the spur gear 7 is included in or excluded from the transmission of force through these drive means. This causes the transverse movement of the tool carrier 35 in one or the opposite direction.

The movements of the tool carrier are controlled by means of the following arrangement:

A slidable rod 37 (Fig. 2) is provided in the longitudinal bore 36 of shaft 23, and the rod 37 is rigidly connected with the movable clutch part 28 by means of a pin 38. The outer end of the push rod 37 is provided with a notch 39 into which the extension 41 of a two-armed lever 40 is inserted, and lever 40 is pivotally connected with the shaft 23. The two arms 42 of the lever 40 are located in a sleeve 43, which is slidably arranged on shaft 23 and of such a shape that an axial displacement of the sleeve 43 turns the lever 40 about its pivoting point and the lever itself effects a displacement of the rod 37 within the bore 36 of shaft 23. The sleeve 43 carries a ball-shaped knob 44 surrounded by a joint member 45, which is arranged in a sleeve-shaped hub 46 carried by shaft 23 (compare Figs. 1 and 3). A hand lever 47 is inserted in the joint member 45. The hub 46 carries a gear segment 50, which meshes with gear 51 engaging a gear segment 52. The gear segment 52 is carried by a sleeve 53 provided to turn about the shaft 8. The sleeve 53 comprises an internal thread 54 engaging a thread 55 of a push rod 56 arranged within the bore of shaft 8. The push rod 56 is rigidly connected with the movable clutch part 12 by means of a pin 57.

Figure 2:
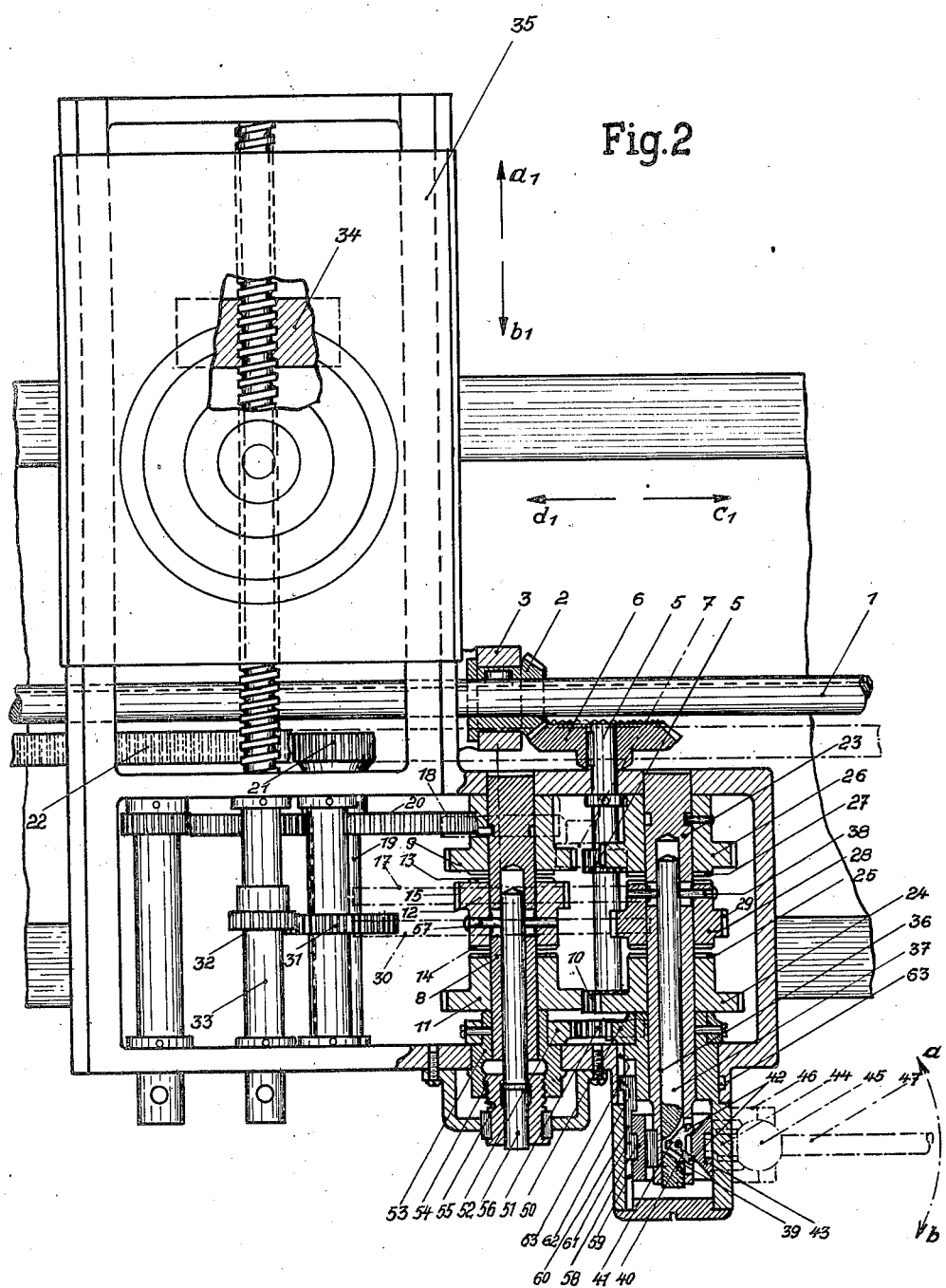
Fig. 2 is a cross-sectional view of the device taken on line II—II of Fig. 1 looking in the direction of the arrows.
Figure 3:
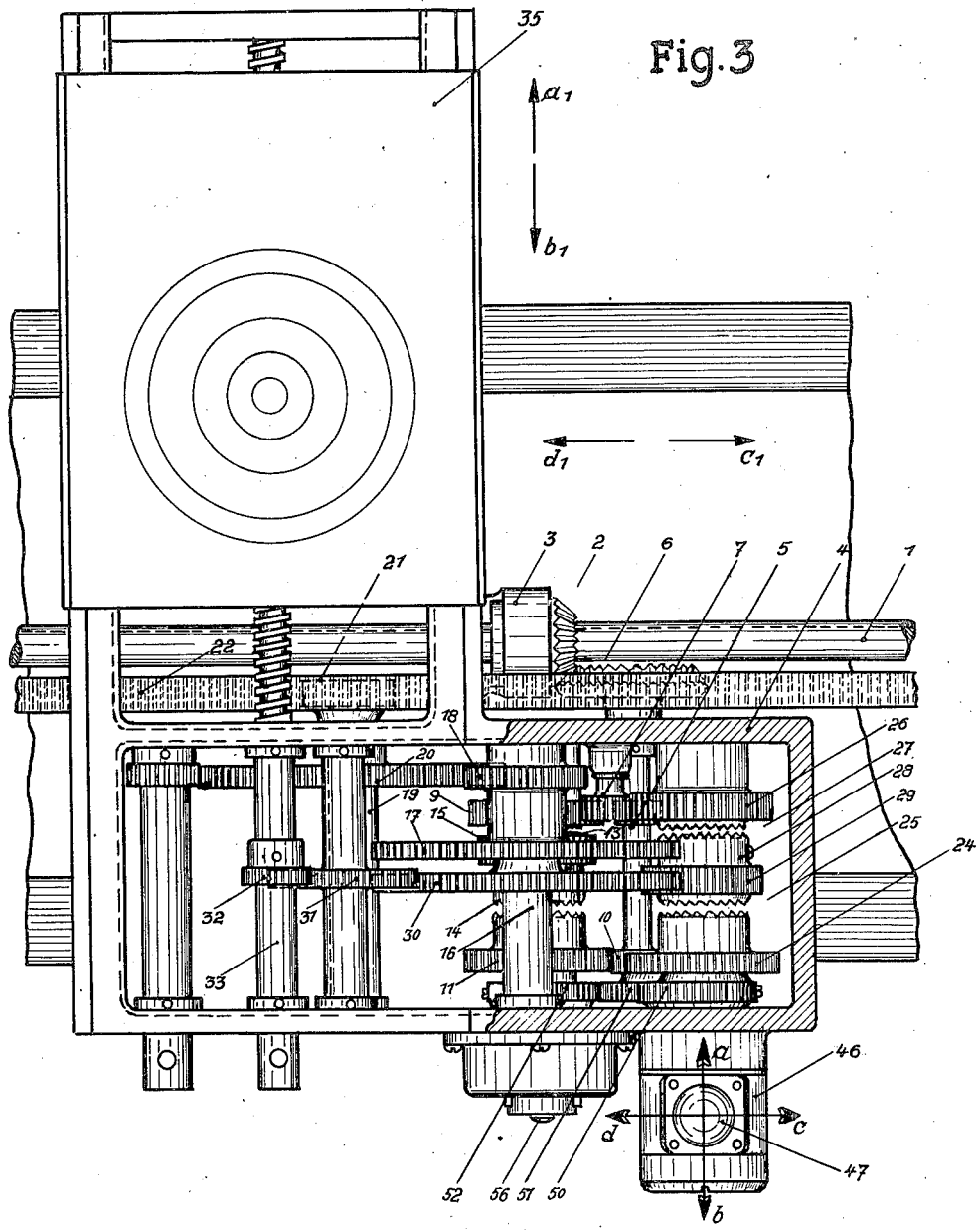
Fig. 3 is a cross-sectional of the device taken on line III—III of Fig. 1 looking in the direction of the arrows.

By swinging the hand lever 47 in a direction at right angles to the plane of the drawing shown in Fig. 1 a transverse movement of the housing 4 and consequently of the tool carrier 35 is effected. If the lever 47 is moved in the direction of the arrow $a$ (Figs. 2 and 3) the push rod 37 guided in the shaft 23 is displaced in such a direction, that the clutch part 28 connected with the push rod 37 comes in engagement with the toothed surface 25 of gear 24 and is rotated by the latter. The gear rim 29 transmits this rotation to the spindle 33 by means of the gears 30, 31 and 32; the spindle 33 rotates now in such a direction, that the tool carrier 35 moves transversely in the direction of the arrow $a_1$ (Figs. 2 and 3). This movement is caused by virtue of the construction and the arrangement of the drive means in the same direction as the direction of the swing motion of the hand lever 47, which starts this movement (compare arrow $a$). If the hand lever 47 is moved in the opposite direction (arrow $b$, Fig. 2) the clutch part 28 comes in engagement with gear 26. Owing to the interposition of gear 7, the gear 26 rotates in the opposite direction as gear 24 does, so that the transmitting gears between the clutch part 28 and the spindle 33 rotate likewise in an opposite direction and effect a displacement of the tool carrier 35 in the direction of the arrow $b_1$. An obvious correspondency between the directions $b$ and $b_1$ exists in this case also (compare with Fig. 3).

The longitudinal movement of the housing 4 and the tool carrier 35 is caused by shifting the hand lever 47 in the plane of the drawing shown in Fig. 1 (compare the arrows $c$ and $d$ in Figs. 1 and 3). During this shift motion the nave 46 is carried along by the lever 47. The gear segment 50 transmits the shift motion to gear 51, gear segment 52 and the sleeve 53, which supports the gear segment 52. The thread connection 54, 55 transforms the rotary motion of the sleeve 53 into an axial displacement of the push rod 56 causing a displacement of the clutch part 12 supported by shaft 8. According to the throw of the hand lever 47 in the direction of arrow $c$ or arrow $d$ the toothed surface 13 of the clutch 12 engages the toothed end surface of gear 9 or the toothed surface 14 of the clutch meshes with the teeth of the end surface of gear 11, thus causing the clutch part 12 with its gear teeth 15 to rotate in one or the other direction. This rotation is transmitted by the gears 17, 18 and 20 to the gear 21 engaging the teeth of rack 22, which is affixed to the bed of the machine tool and the housing 4 as well as the tool carrier are forced to move longitudinally in one or the other direction. In this case also the drive means are arranged in such a manner, that the throw of the hand lever 47 in the direction of the arrow $c$ corresponds with the resulting longitudinal movement of the tool carrier in the same direction $c_1$; the same applies to the hand lever motion in the direction of arrow $d$ and the movement of the housing in the direction of the arrow $d_1$.

Furthermore the invention relates to a device for locking the shift movements of the hand lever 47. For this purpose the sleeve 43 (Fig. 2) is provided with a groove 58, which guides the extension 61 of a key 60 slidably arranged in a longitudinally extending groove 59 of the hub 46. The extension 62 on the other end of the key 60 is guided in a cross-shaped groove 63 provided in the housing 4. The position of this groove is determined by the movements of the extension 62 of key 60 during the shift motions of the shift lever 47 in the directions of the arrows $a$, $b$, $c$ and $d$; such an arrangement determines exactly the cross-wise movement of the shift lever 47 (compare Fig. 3) and ascertains its correct operation during the transmission of the shift motions. If the extension 62 of the key 60 is positioned on the intersection of the groove 63 the shift lever 47 also is in zero position and the clutches 12 and 28 are disengaged with the result, that the drive for longitudinal movement as well as for transverse movement of the tool carrier 35 is disconnected from the machine drive.

We claim:

1. In a gear shift mechanism for the tool carrier of a machine tool, a cross feed drive and a longitudinal drive comprising a pair of parallel shafts, a pair of spaced gears mounted upon each of said shafts, means for driving said gears, a clutch interposed between and engageable selectively with the spaced gears of each pair of gears, gear trains connected to said clutches for reversibly actuating the cross feed drive and the longitudinal feed drive, respectively, clutch shift rods joined to each clutch, and a single operating lever joined to both of said rods for individually operating each clutch and its associated drive.

2. In a gear shift mechanism as in claim 1, said parallel shafts each being hollow, and a clutch shift rod being in each hollow shaft.

3. In a gear shift mechanism as in claim 1, said operating lever being directly connected to one of said rods, and gear means for connecting said lever to the other of said rods.

4. In a gear shift mechanism as in claim 1, said parallel shafts each being hollow, a clutch shift rod being in each hollow shaft, said operating lever being mounted upon one of said shafts and connected to the rod therein, and means operably interconnecting said lever and the other of said rods.

5. In a gear shift mechanism as in claim 1, a sleeve mounted upon one of said shafts and joined to said lever, and key means secured to said sleeve for limiting the movement of said lever to two planes which intersect.

WALTER MÖBIUS.
HANS HAUTSCH.